(12) United States Patent
Krug

(10) Patent No.: US 8,789,794 B2
(45) Date of Patent: Jul. 29, 2014

(54) INERT GAS DISTRIBUTION SYSTEM FOR A FUEL TANK

(75) Inventor: David Scott Krug, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 13/219,389

(22) Filed: Aug. 26, 2011

(65) Prior Publication Data

US 2013/0048144 A1    Feb. 28, 2013

(51) Int. Cl.
*B64D 37/02*    (2006.01)
*B65D 90/22*    (2006.01)
*F16K 31/18*    (2006.01)

(52) U.S. Cl.
USPC .................. 244/135 R; 220/88.3; 137/447

(58) Field of Classification Search
USPC ......... 137/206, 207, 208, 209, 447, 448, 266,
137/255, 883, 165; 220/88.3; 244/135 R
See application file for complete search history.

(56) References Cited

U.S. PATENT DOCUMENTS

| | | | |
|---|---|---|---|
| 1,544,608 A * | 7/1925 | Smith et al. .................... | 137/447 |
| 3,587,618 A | 6/1971 | Kenyon | |
| 3,590,559 A | 7/1971 | Bragg et al. | |
| 6,698,692 B1 | 3/2004 | Tichenor et al. | |
| 7,152,635 B2 * | 12/2006 | Moravec et al. ................. | 141/64 |
| 7,621,483 B2 * | 11/2009 | Cozens et al. ............ | 244/135 R |
| 7,918,358 B2 | 4/2011 | Gupta | |
| 2011/0068231 A1 | 3/2011 | Surawski | |

* cited by examiner

*Primary Examiner* — Craig Schneider
*Assistant Examiner* — Kevin E Lynn
(74) *Attorney, Agent, or Firm* — Yee & Associates, P.C.

(57) ABSTRACT

A method and apparatus comprising a tube, an opening in the tube, and a valve associated with the opening. The tube is configured to carry an inert gas in a fuel tank. The valve is configured to control an amount of the inert gas that exits the opening based on a level of fuel relative to the opening.

16 Claims, 17 Drawing Sheets

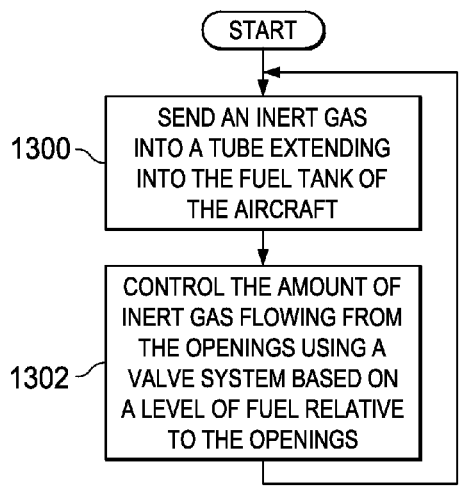
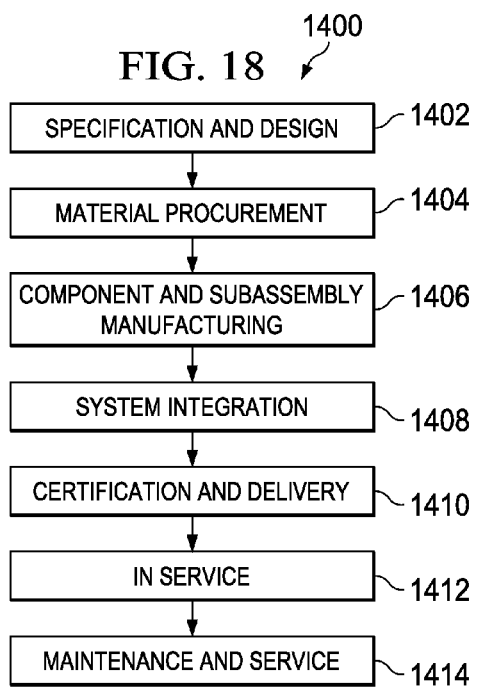
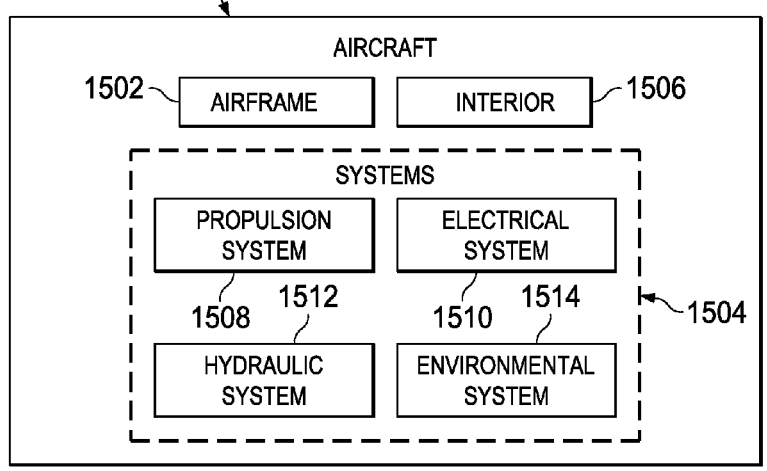

INERT GAS DISTRIBUTION SYSTEM FOR A FUEL TANK

BACKGROUND INFORMATION

1. Field

The present disclosure relates generally to vehicles and, in particular, to inert gas systems used in fuel tanks in vehicles. Still more particularly, the present disclosure relates to a method and apparatus for managing inert gas in a fuel tank of an aircraft.

2. Background

Fuel tanks in vehicles carry fuel that is used to operate the engines of a vehicle. The fuel is flammable in the presence of oxygen or air. When fuel is used, the level of fuel decreases. This decrease in the level of fuel results in a space increasing in size above the level of fuel in the fuel tank. The space above the fuel may contain air and fuel vapors. This space may be referred to as an "ullage".

Increased safety for fuel tanks may be provided through the use of an inert gas system. The inert gas system may generate and distribute an inert gas to reduce the oxygen content that may be present in the fuel tanks. In particular, the space above the surface of the fuel in the fuel tank is filled with an inert gas.

The inert gas displaces air that contains oxygen in the fuel tank. The inert gas may also displace fuel vapors and other elements. This process is called "inerting". The inert gas reduces the oxygen content in this space in a manner that reduces a possibility of a combustion event, including ignition, detonation, or deflagration. The combustion event may be the combustion of the fuel, fuel vapor, or both.

The inert gas is introduced using the inert gas system. These systems, however, may be more complex and heavier than desired based on the efficiency of the distribution system in an inert gas system.

Therefore, it would be advantageous to have a method and apparatus that takes into account at least some of the issues discussed above, as well as possibly other issues.

SUMMARY

In one advantageous embodiment, an apparatus comprises a tube, an opening in the tube, and a valve associated with the opening. The tube is configured to carry an inert gas in a fuel tank. The valve is configured to control an amount of the inert gas that exits the opening based on a level of fuel relative to the opening.

In another advantageous embodiment, a fuel tank system comprises a fuel tank, an inert gas system, and a valve system. The inert gas system has openings configured for an inert gas in the fuel tank system to pass into the fuel tank. The valve system is configured to control the amount of the inert gas that flows from the openings into the fuel tank based on a level of fuel in the fuel tank.

In yet another advantageous embodiment, a method of managing an inert gas in a fuel tank is provided. The inert gas is sent into a tube extending into the fuel tank. The tube has openings. An amount of the inert gas flowing from the openings is controlled using a valve system based on a level of fuel relative to the openings.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

FIG. 17 is an illustration of a flowchart of a process for managing inert gas in a fuel tank in accordance with an advantageous embodiment;

FIG. 18 is an illustration of an aircraft manufacturing and service method in accordance with an advantageous embodiment; and FIG. 19 is an illustration of an aircraft in which an advantageous embodiment may be implemented.

DETAILED DESCRIPTION

The different advantageous embodiments recognize and take into account one or more different considerations. For example, the different advantageous embodiments recognize and take into account that one manner in which an inert gas distribution system may be implemented is through the use of tubes with openings located within the fuel tank. An inert gas generator may be used to send an inert gas through the tube. The inert gas may enter the fuel tank through the opening in the tube. In this manner, the inert gas may replace oxygen that may be located in the space above the level of the fuel.

The different advantageous embodiments recognize and take into account that with the use of multiple openings, flow splits and pressure losses occur along the length of the tube. As a result, an inert gas generator may be larger than desired to provide a desired amount of inert gas to remove air from the space in a tank that is above the level of the fuel.

The different advantageous embodiments recognize and take into account that a fuel tank in a wing may have compartments formed from partitions. These partitions may be structures, such as ribs. The geometry of the wing may result in some of the compartments having a space above the level of fluid, while other compartments may not. Further, these different components may have limited communication between them. As a result, the different advantageous embodiments recognize and take into account that these spaces may include air, fuel vapors, and other elements. The different advantageous embodiments recognize and take into account that the location of these spaces may make it more difficult to inert the fuel tank than desired. As a result, an increase in flow of the inert gas introduced into the fuel tank may be required.

The different advantageous embodiments also recognize and take into account that many aircraft have a positive or negative wing dihedral. For example, a positive wing dihedral means that the tip of the wing is higher than the root of the wing in normal operation of the aircraft. The different advantageous embodiments recognize and take into account that an inert gas distribution system may need to have tubes routed to account for changing fuel surface locations as fuel is consumed by the engines.

Thus, the different advantageous embodiments provide a method and apparatus for managing the introduction of an inert gas into a fuel tank. In one advantageous embodiment, an apparatus comprises a tube configured to carry an inert gas in a fuel tank. An opening is present in the tube. A valve is associated with the opening. The valve is configured to control the amount of inert gas that exits the opening in the fuel tank based on the level of fuel relative to the opening.

Figure 1:
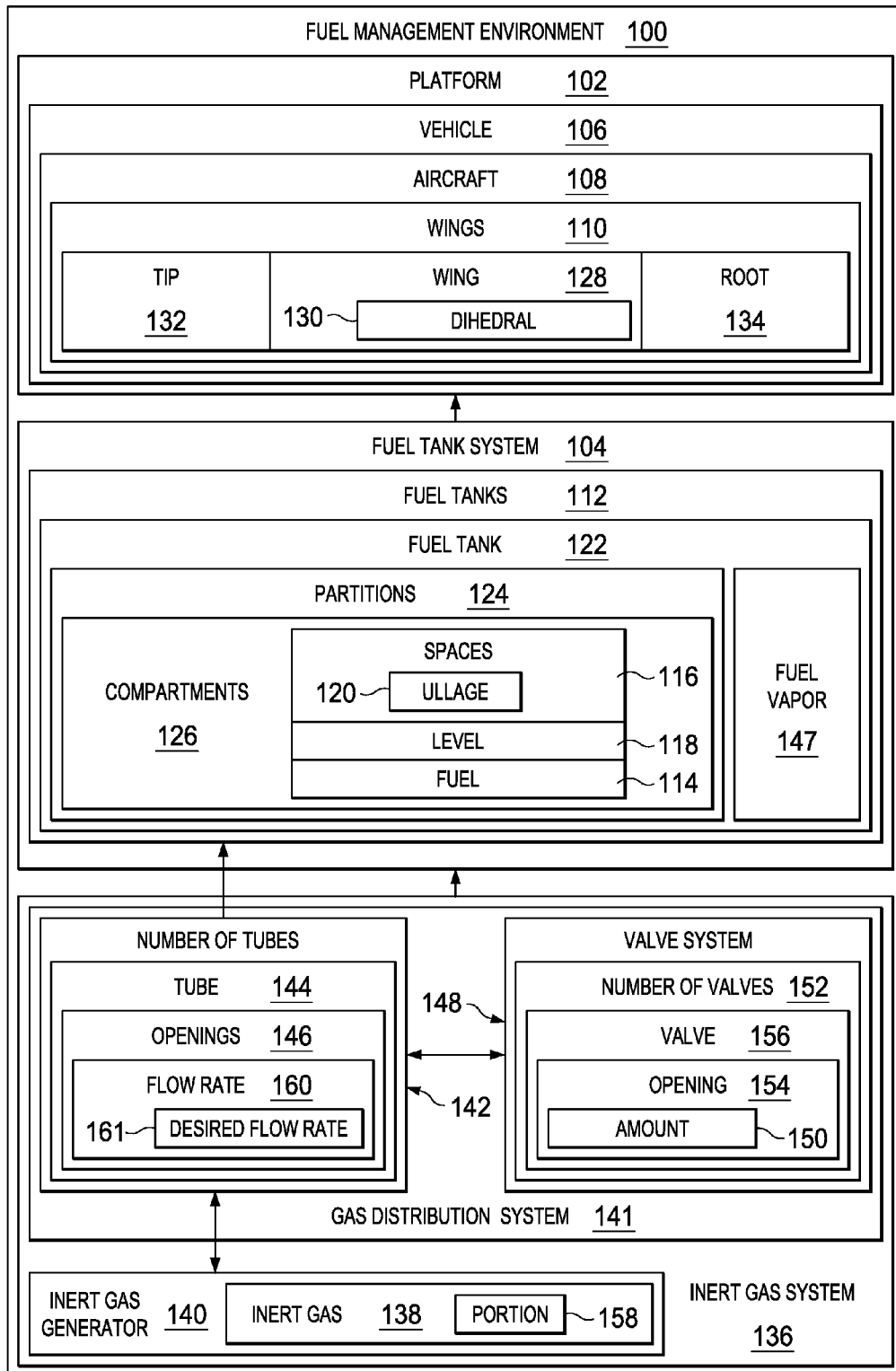
FIG. 1 is an illustration of a block diagram of a fuel movement environment in accordance with an advantageous embodiment.

Turning first to FIG. 1, an illustration of a block diagram of a fuel management environment is depicted in accordance with an advantageous embodiment. In this illustrative example, fuel management environment 100 comprises platform 102. In this illustrative example, platform 102 includes fuel tank system 104. Platform 102 may take various forms. For example, without limitation, platform 102 may take the form of vehicle 106 and, in particular, aircraft 108.

When platform 102 takes the form of aircraft 108, fuel tanks 112 may be present in wings 110 in fuel tank system 104.

Fuel tanks 112 carry fuel 114. Spaces 116 may be present above level 118 of fuel 114. In other words, spaces 116 may be a volume located above level 118 of fuel 114 in fuel tanks 112. In these illustrative examples, spaces 116 may be referred to as ullage 120. Ullage 120 may have air, oxygen, fuel vapors, and/or other elements that may be undesirable in ullage 120 in fuel tanks 112.

In one illustrative example, fuel tank 122 may include partitions 124 that form compartments 126 in fuel tank 122. Partitions 124 may be various structures in wing 128. For example, partitions 124 may be formed from ribs, spars, and/or other structures in wing 128.

Partitions 124 allow for fuel 114 to flow between compartments 126. This flow of fuel 114 may be reduced or limited by partitions 124. In other words, the flow of fuel 114 may not be as free as when partitions 124 are absent.

Further, wing 128 in which fuel tank 122 is located may have dihedral 130. Dihedral 130 may be positive or negative. For example, when dihedral 130 is a positive dihedral, tip 132 of wing 128 is positioned higher than root 134 of wing 128 during normal operation. With dihedral 130 being a negative dihedral, tip 132 of wing 128 is positioned lower than root 134 of wing 128 during normal operation. Root 134 of wing 128 is a portion of wing 128 connected to the body of the aircraft in these illustrative examples.

Inert gas system 136 may distribute inert gas 138 into wing 128. In particular, inert gas 138 may be distributed into compartments 126 in a manner that causes inert gas 138 to be present in spaces 116 in compartments 126 in a manner that reduces a possibility that combustion of fuel 114 or fuel vapor 147 may occur. In particular, inert gas 138 may replace air, oxygen, fuel vapor 147, and/or other elements that may increase a possibility of combustion of fuel 114.

In these illustrative examples, inert gas system 136 comprises inert gas generator 140 and gas distribution system 141. As depicted, gas distribution system 141 includes number of tubes 142. One or more of number of tubes 142 may be present within fuel tank 122 in these illustrative examples. For example, tube 144 in number of tubes 142 may extend through at least a portion of compartments 126 in fuel tank 122.

The material used in tube 144 may vary, depending on the particular implementation. For example, the material may be selected from one of aluminum, steel, plastic, a composite material, polycarbonate, and/or other suitable materials. Factors that may affect the choice of materials may include weight, load, and cost.

In these illustrative examples, tube 144 has openings 146. Inert gas 138 flows through tube 144 and into fuel tank 122 through openings 146.

In these illustrative examples, inert gas 138 may be selected as any non-reactive gas with respect to fuel 114, fuel vapor 147, or both in fuel tank 122. In other words, inert gas 138 is selected as a gas that may reduce the possibility that fuel 114, fuel vapor 147, or both may be ignited within fuel tank 122. Inert gas 138 may be selected from one of nitrogen, neon, argon, helium, krypton, xenon, radon, sulfur hexafluoride, carbon dioxide, air with reduced oxygen content, and/or other suitable gases.

In these illustrative examples, valve system 148 is associated with number of tubes 142. In particular, valve system 148 controls amount 150 of inert gas 138 that passes into fuel tank 122 from inert gas system 136. Valve system 148 comprises number of valves 152 associated with openings 146. Some or all of openings 146 may be associated with number of valves 152 in these illustrative examples.

For example, valve 156 in valve system 148 may be associated with opening 154 in openings 146. Valve 156 is configured to control amount 150 of inert gas 138 that exits opening 154 based on level 118 of fuel 114 relative to opening 154. In these illustrative examples, valve 156 may change amount 150 of inert gas 138 that flows through opening 154 by different increments. In other words, opening valve 156 may partially close opening 154 rather than entirely closing opening 154.

Portion 158 of openings 146 that are located above level 118 of fuel 114 may be closed such that inert gas 138 does not exit through portion 158 of openings 146. In this manner, flow rate 160 of inert gas 138 may be increased or managed at desired flow rate 161 to the desired locations in fuel tank 122.

In these illustrative examples, portion 158 of openings 146 means some of the openings in openings 146 may be closed. In addition, in some illustrative examples, portion 158 of openings 146 may mean that some of the openings in openings 146 may be partially closed.

In this manner, inert gas system 136 takes into account a situation in which openings 146 may be located above level 118 of fuel 114. This situation may occur with positive dihedral 130. If inert gas 138 is introduced into portion 158 of openings 146 located above level 118 of fuel 114, inert gas 138 may travel through compartments 126 to tip 132 and be vented rather than inerting spaces 116. However, with valve system 148, the situation may be reduced or avoided.

As a result, inert gas generator 140 may not need to work as hard to generate flow rate 160 at a desired level to inert spaces 116 in fuel tank 122. Thus, a smaller and/or lighter inert gas generator may be used to implement inert gas generator 140 when valve system 148 is used in inert gas system 136.

The illustration of fuel management environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, although platform 102 has been described as vehicle 106 in the form of aircraft 108, platform 102 may take other forms, depending on the particular implementation. For example, platform 102 may be selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a building, a skin panel, an engine, a section of a gas pipeline, and/or other suitable objects.

Figure 2:
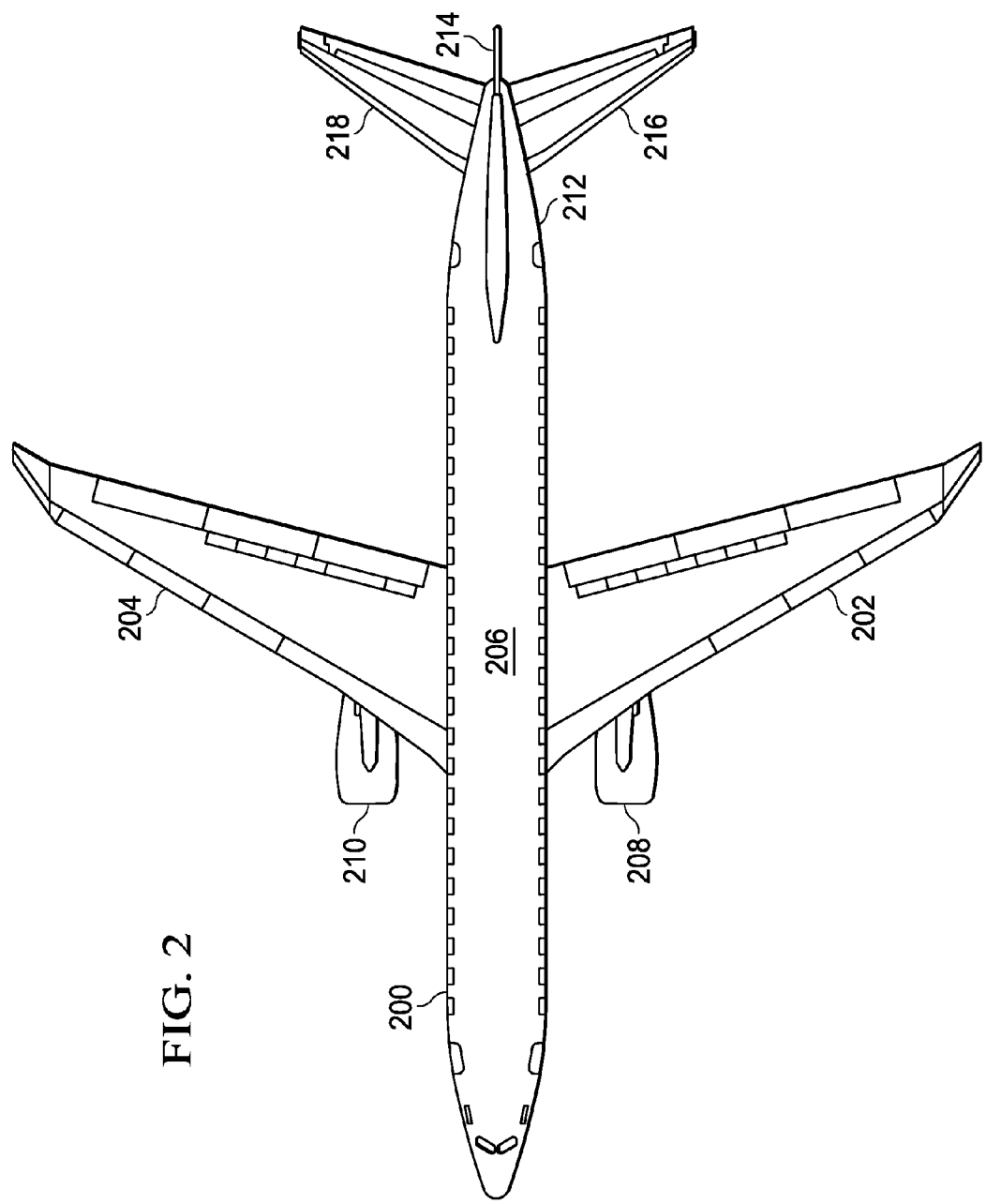
FIG. 2 is an illustration of a platform in which an inert gas system may be implemented in accordance with an advantageous embodiment.

With reference now to FIG. 2, an illustration of a platform in which an inert gas system may be implemented is depicted in accordance with an advantageous embodiment. In this illustrative example, aircraft 200 is an example of an implementation for aircraft 108 in FIG. 1. Aircraft 200 has wing 202 and wing 204 attached to body 206 of aircraft 200. Additionally, aircraft 200 also includes engine 208 attached to wing 202 and engine 210 attached to wing 204. Aircraft 200 also has tail 212. Tail 212 includes vertical stabilizer 214, horizontal stabilizer 216, and horizontal stabilizer 218.

In these illustrative examples, number of tubes 142 in inert gas system 136 in FIG. 1 may be located in wing 202 and wing 204 of aircraft 200. The inert gas system in aircraft 200 may be implemented using inert gas system 136 shown in block form in FIG. 1.

Figure 3:
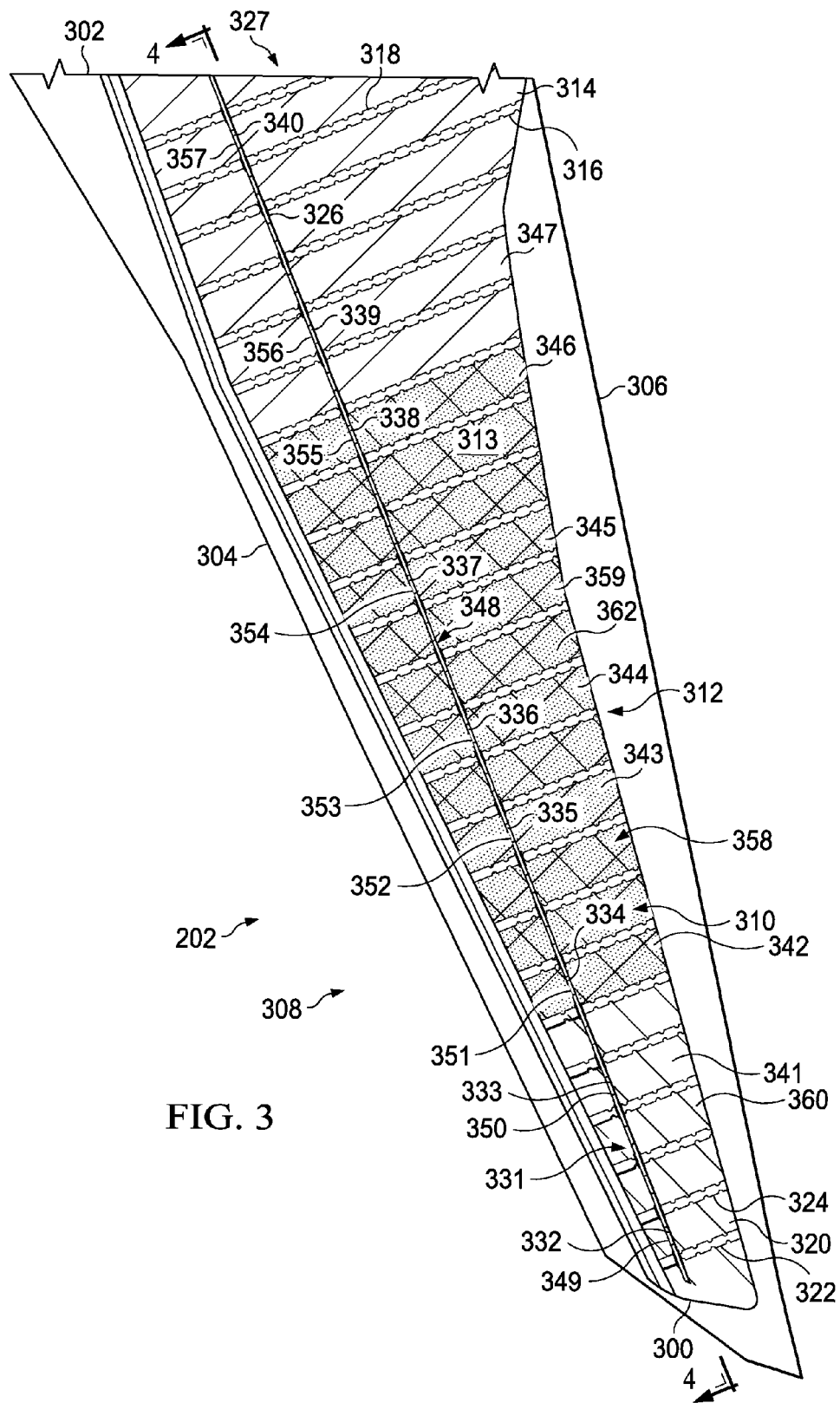
FIG. 3 is an illustration of a portion of an inert gas distribution system in a wing in accordance with an advantageous embodiment.

With reference now to FIG. 3, an illustration of a portion of an inert gas system in a wing is depicted in accordance with an advantageous embodiment. As depicted, wing 202 on aircraft 200 in FIG. 2 has tip 300 and root 302. Root 302 is the portion of wing 202 connected to body 206. Additionally, wing 202 has leading edge 304 and trailing edge 306.

In this depicted example, wing 202 is shown in an exposed view such that fuel tank 308 within wing 202 can be seen. Fuel tank 308 is comprised of plurality of compartments 310. Plurality of compartments 310 are formed by partitions 312 in this illustrative example. Partitions 312 extend substantially perpendicular from lower skin 313 of wing 202 in this illustrative example.

For example, compartment 314 is formed from partition 316 and partition 318. Compartment 320 is formed from partition 322 and partition 324. In this illustrative example, wing 202 has a positive dihedral. In other words, compartment 314 is located closer to root 302 than compartment 320 along a horizontal plane extending across the length of wing 202. Further, compartment 320 is located closer to tip 300 than compartment 314. With these locations, compartment 314 has a lower position as compared to compartment 320 in these illustrative examples.

In this illustrative example, tube 326 in gas distribution system 327 is depicted. Gas distribution system 327 is an example of a physical implementation of gas distribution system 141 for inert gas system 136 shown in block form in FIG. 1. In particular, tube 326 is an example of tube 144 in number of tubes 142 shown in block form in FIG. 1.

Tube 326 extends from root 302 towards tip 300. Openings 331 are present in tube 326. In these illustrative examples, openings 331 comprise opening 332, opening 333, opening 334, opening 335, opening 336, opening 337, opening 338, opening 339, and opening 340.

These openings are located in compartments 314, 320, 341, 342, 343, 344, 345, 346, and 347 in plurality of compartments 310. Additionally, valve system 348 comprises valves 349, 350, 351, 352, 353, 354, 355, 356, and 357, which are associated with openings 332, 333, 334, 335, 336, 337, 338, 339, and 340, respectively. In this illustrative example, the location of tube 326 is located such that inert gas flows from these openings into fuel tank 308.

As depicted, fuel 358 is located in portion 359 of fuel tank 308. Fuel 358 is not present in portion 360 of fuel tank 308. Portion 360 is the ullage in these examples. In these illustrative examples, fuel surface 362 is a boundary between portion 359 and portion 360.

In these illustrative examples, inert gas is introduced into fuel tank 308 in the openings that are located in portion 359 or distance above fuel 358 in portion 359.

Figure 4:
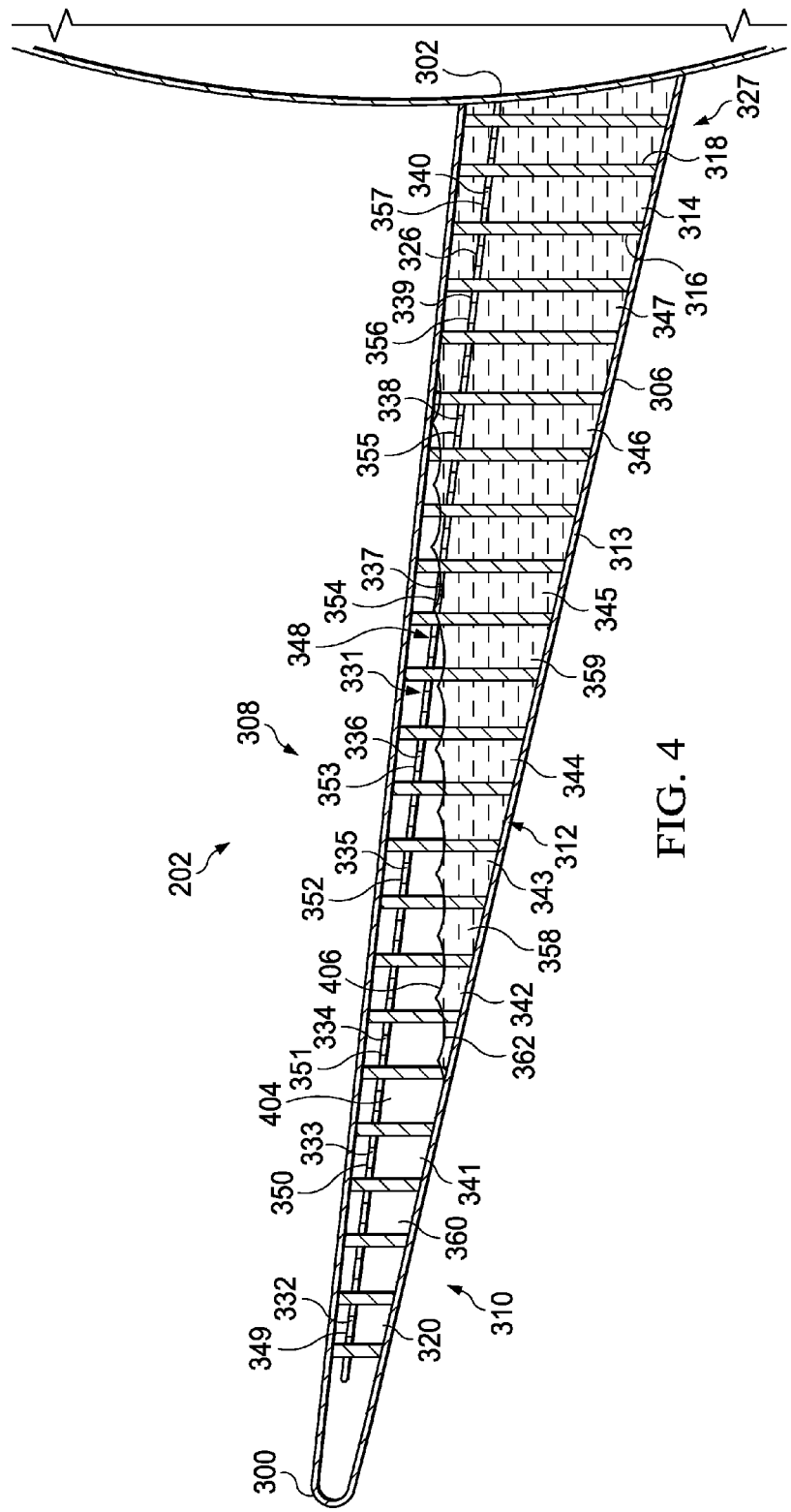
FIG. 4 is an illustration of a cross-sectional view of a wing with a portion of an inert gas distribution system taken along lines 4-4 in FIG. 3 in accordance with an advantageous embodiment.

Turning next to FIG. 4, an illustration of a cross-sectional view of a wing with a portion of an inert gas distribution system is depicted in accordance with an advantageous embodiment. In this depicted example, wing 202 is shown in a cross-sectional view taken along lines 4-4 in FIG. 3. This view of wing 202 provides a view of the positive dihedral for wing 202.

In this view, level 406 of fuel 358 in fuel tank 308 is illustrated. Spaces 404 are spaces in portion 360 located above level 406 of fuel 358. Spaces 404 form the ullage in fuel tank 308. In this illustrative example, level 406 of fuel 358 results in valve system 348 placing a portion of the openings in tube 326 in a closed state, while another portion of the openings are in an open state. The portion of the openings in the closed state depends on level 406 of fuel 358 relative to the openings.

In these illustrative examples, the openings are closed when level 406 is at some amount lower than the openings. Further, the openings may be partially closed as level 406 is at some amount lower than the openings.

Of course, in other illustrative examples, the openings may be closed when level 406 is at the openings, is at some level above the openings, or is substantially at the opening. The selection of when the openings are open and closed may depend on the particular implementation.

Figure 5:
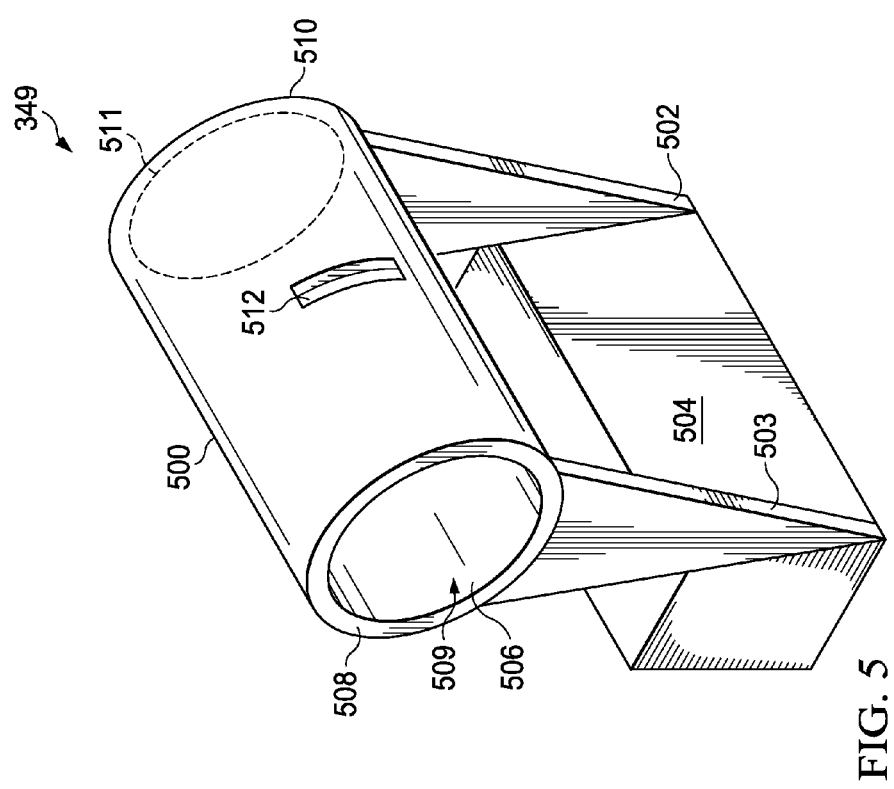
FIG. 5 is an illustration of a valve in accordance with an advantageous embodiment.

With reference now to FIG. 5, an illustration of a valve is depicted in accordance with an advantageous embodiment. In this illustrative example, a perspective view of valve 349 is depicted in more detail. Valve 349 comprises cylindrical portion 500, planar member 502, planar member 503, and float structure 504.

Valve 349 may be made from different materials, depending on the particular implementation. For example, valve 349 may be comprised of at least one of plastic, metal, a composite material, and/or other suitable materials. As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

When valve 349 includes metal, the metal may be, for example, aluminum, titanium, and/or steel. When more than one material is used, different materials may be implemented for different portions of valve 349.

Cylindrical portion 500 is configured to be placed around or receive tube 326 in FIG. 3. As depicted, cylindrical portion 500 has channel 506, which extends from end 508 to end 510 of cylindrical portion 500. Opening 509 is located at end 508, and opening 511 is located at end 510. In this illustrative example, cylindrical portion 500 also has opening 512, which is in communication with channel 506.

In these illustrative examples, the material selected for float structure 504 is a material that is configured to have buoyancy in fuel in these illustrative examples. In some illustrative examples, the material may not itself have buoyancy in fuel but may have a gas or liquid-filled interior, which results in float structure 504 being buoyant in fuel.

In these illustrative examples, opening 512 is configured to be able to move to line up or correspond to opening 332 in tube 326 on which valve 349 in FIG. 3 is associated. Opening 512 may allow for all or a portion of opening 332 in tube 326 to be exposed to allow for inert gas to flow from opening 332 in tube 326.

Figure 6:
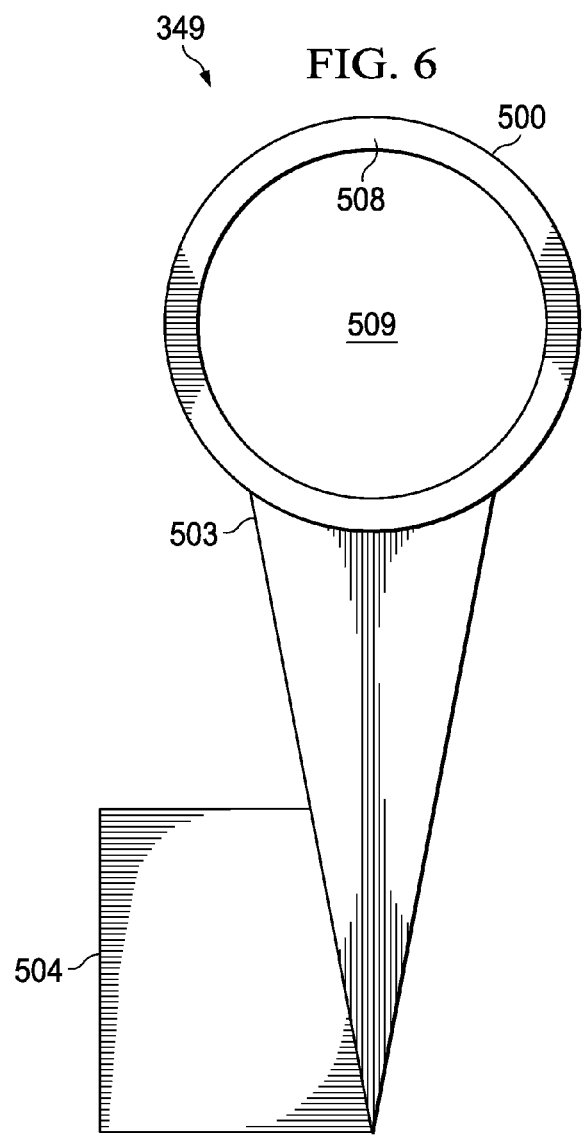
FIG. 6 is an illustration of a side view of a valve in accordance with an advantageous embodiment.

With reference now to FIG. 6, an illustration of a side view of a valve is depicted in accordance with an advantageous embodiment. In this illustrative example, valve 349 is shown from end 508.

Figure 7:
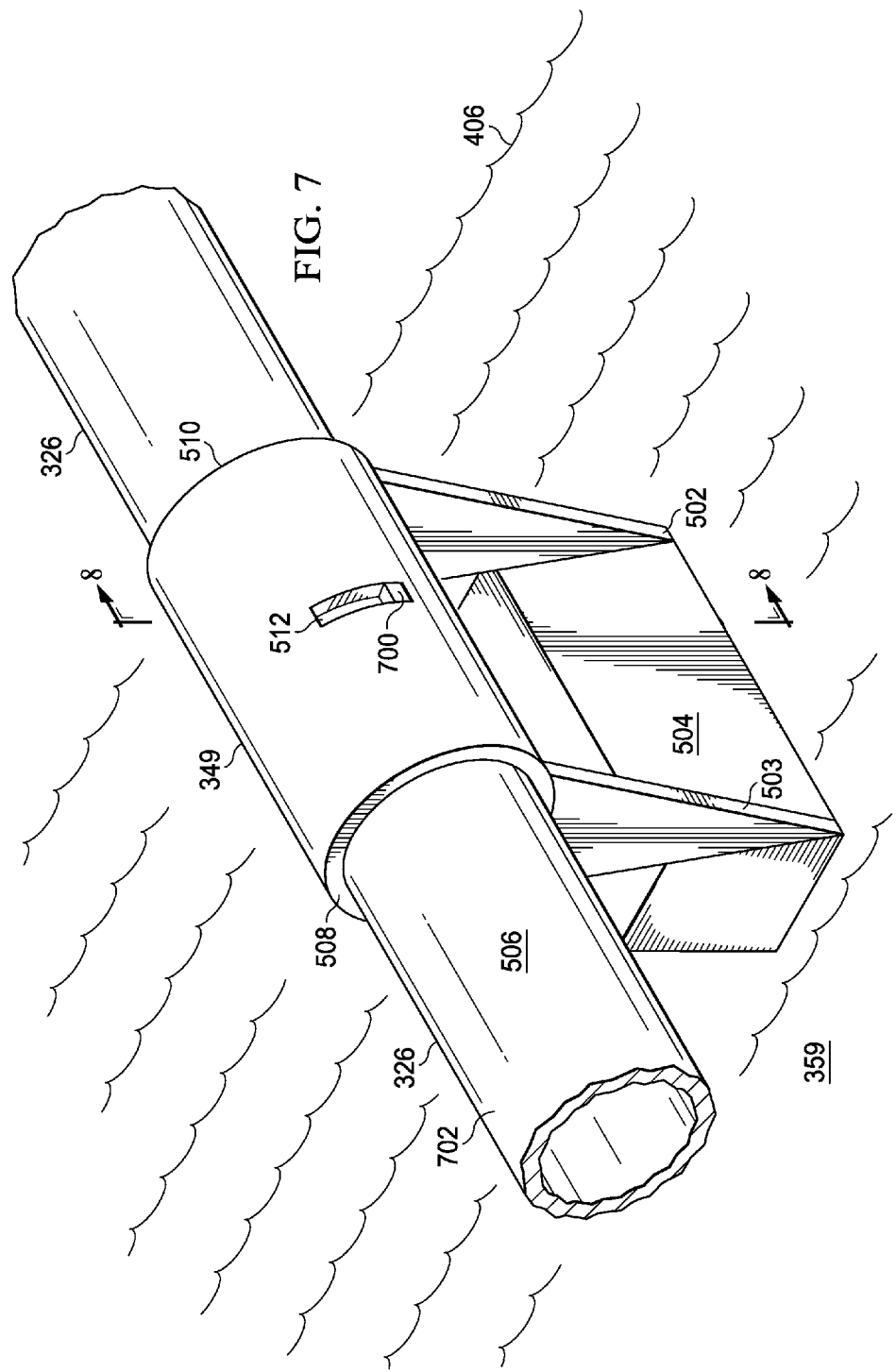
FIG. 7 is an illustration of a valve associated with a tube in accordance with an advantageous embodiment.

With reference now to FIG. 7, an illustration of a valve associated with a tube is depicted in accordance with an advantageous embodiment. In this illustration, a perspective view of tube 326 with valve 349 is depicted.

In this illustrative example, opening 512 does not expose opening 332 (not shown in this view) in tube 326. In this position, valve 349 closes opening 332 such that inert gas in tube 326 does not flow out of opening 332. Opening 332 is in a closed state in this example. Valve 349 is in this closed position when level 406 in FIG. 4 of fuel 358 is below float structure 504.

In this illustration, tab 700 extends from surface 702 of tube 326. Tab 700 may restrict or limit the movement of valve 349.

Figure 8:
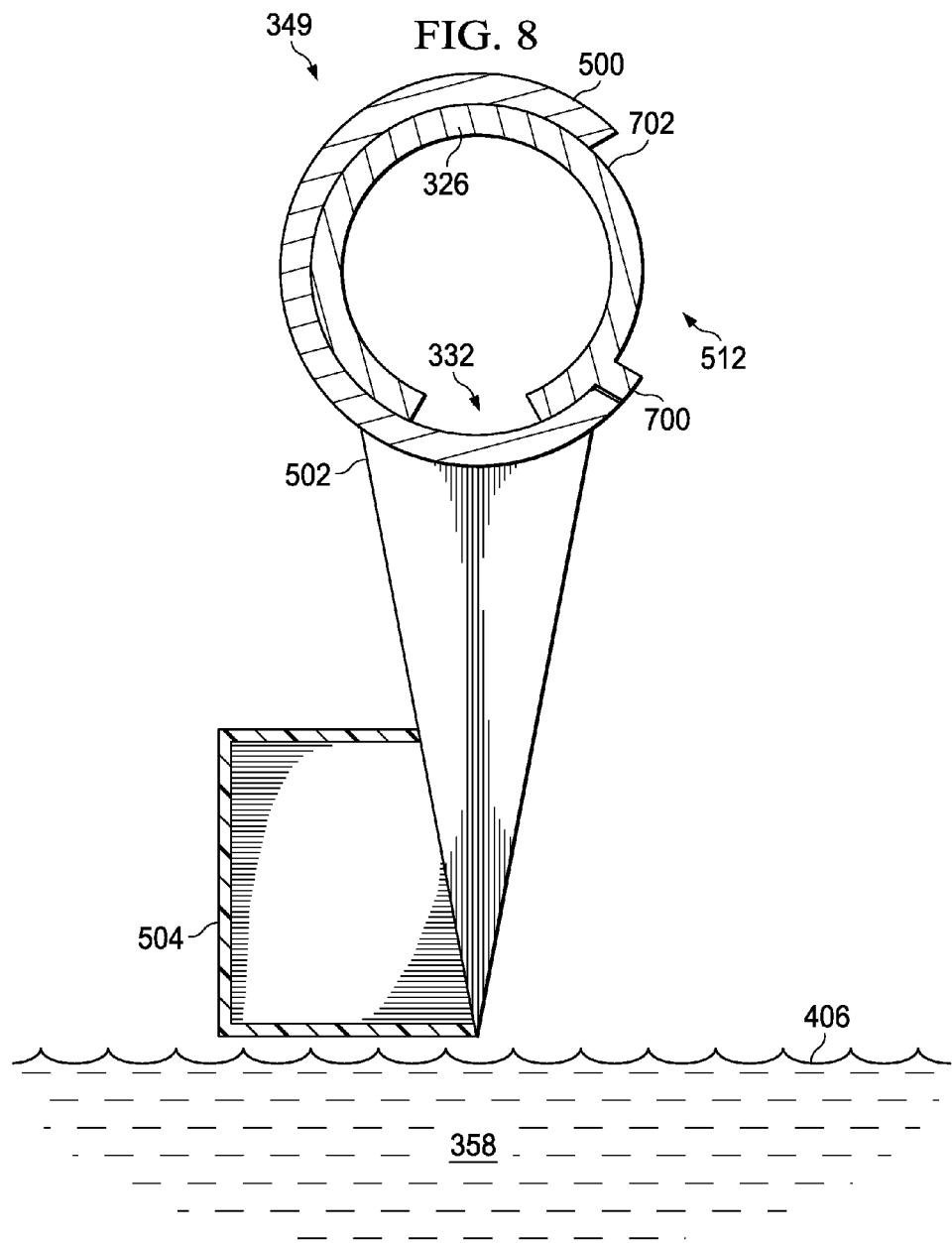
FIG. 8 is an illustration of a cross-sectional view of a valve relative to an opening in a tube for an inert gas distribution system taken along lines 8-8 in FIG. 7 in accordance with an advantageous embodiment.

With reference now to FIG. 8, an illustration of a cross-sectional view of a valve relative to an opening in a tube for an inert gas distribution system is depicted in accordance with an advantageous embodiment. In this illustrative example, a cross-sectional view of tube 326 with valve 349 is depicted. This cross section is taken along lines 8-8 in FIG. 7. As can be seen in this illustrative example, valve 349 is in a closed position such that opening 332 is not in communication with opening 512 of valve 349. As can be seen, level 406 of fuel 358 is below float structure 504.

Figure 9:
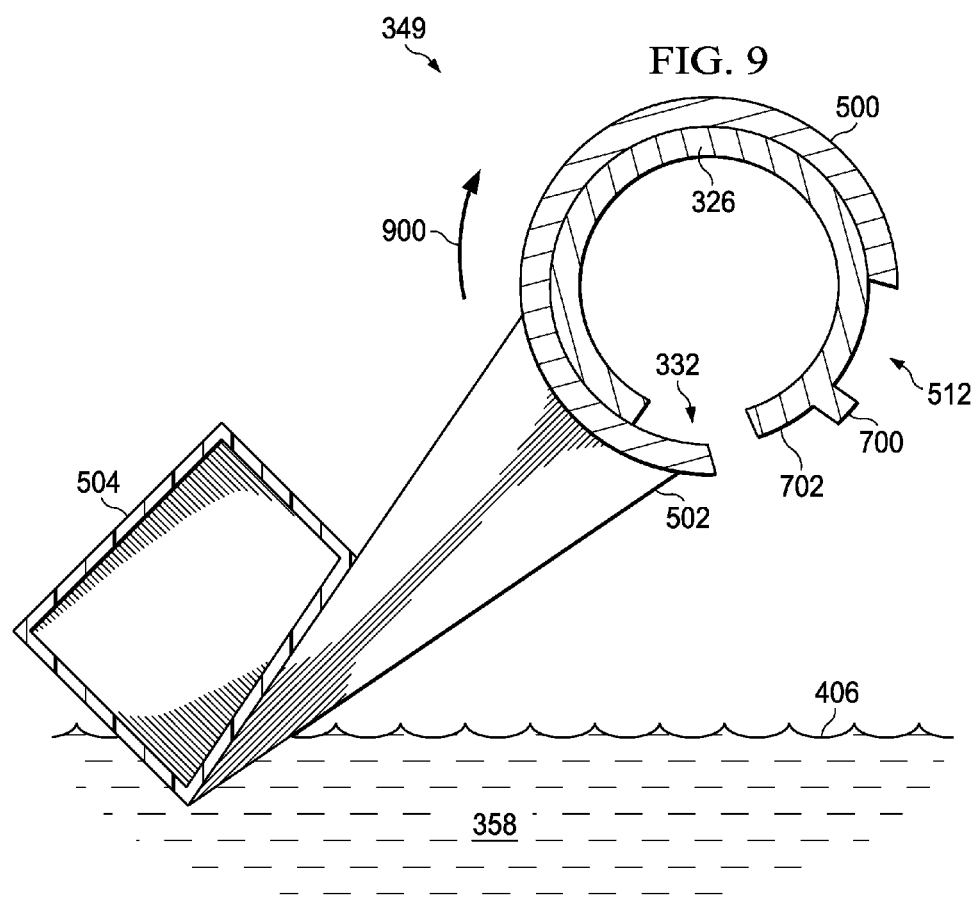
FIG. 9 is an illustration of a valve in a partially open position in accordance with an advantageous embodiment.

Turning next to FIG. 9, an illustration of a valve in a partially-open position is depicted in accordance with an advantageous embodiment. In this illustrative example, level 406 of fuel 358 is higher relative to tube 326.

As can be seen in this illustrative example, float structure 504 is partially immersed in the fuel. As the fuel rises, float structure 504 is buoyant within fuel 358. Float structure 504 is configured to move such that valve 349 rotates in the direction of arrow 900.

This rotation causes opening 512 to line up with a portion of opening 332. As can be seen in this illustrative example, opening 332 is partially exposed to allow inert gas to flow from opening 332. In this example, opening 332 is in a partially-open state.

Figure 10:
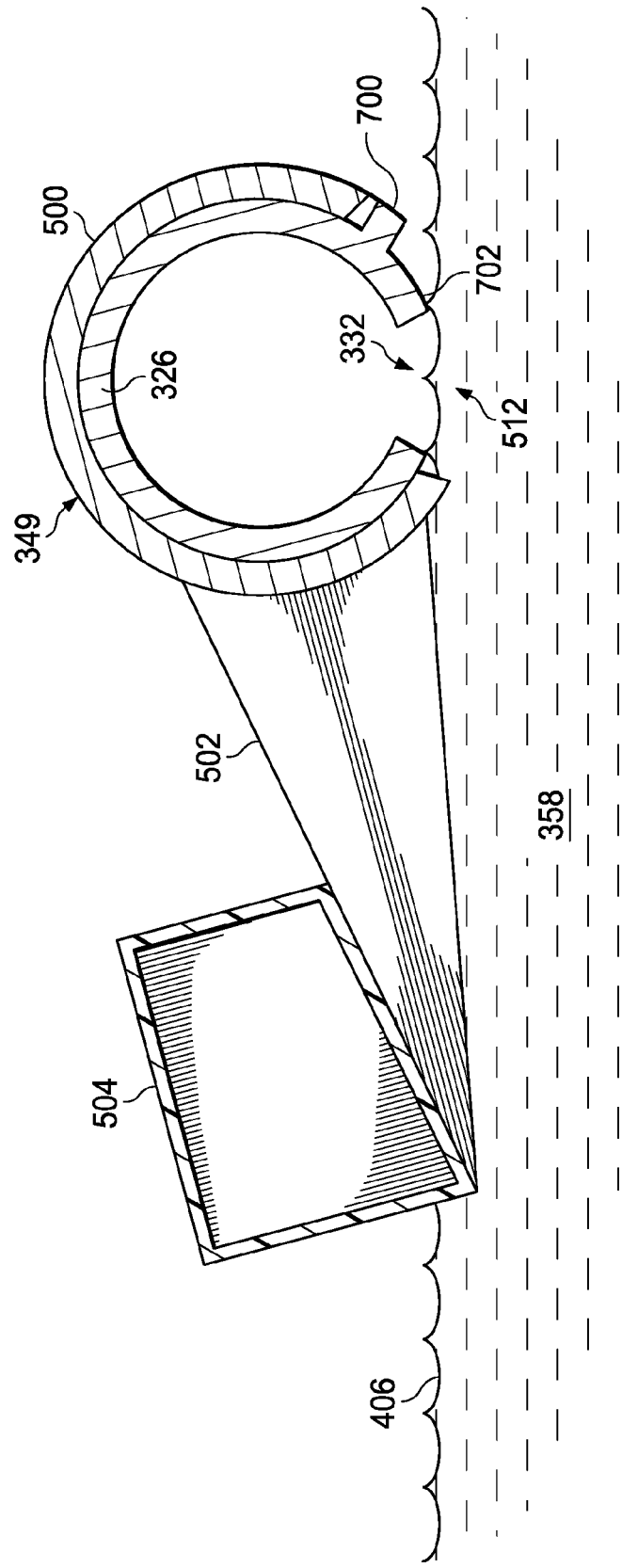
FIG. 10 is an illustration of a valve in an open position in accordance with an advantageous embodiment.

With reference now to FIG. 10, an illustration of a valve in an open position is depicted in accordance with an advantageous embodiment. In this illustrative example, level 406 of fuel 358 is above tube 326. With this level for fuel 358, valve 349 is in an entirely-open position. All of opening 332 now corresponds or lines up with opening 512. As a result, opening 332 is fully open. As can be seen in this illustrative example, tab 700 restricts the amount of rotation of valve 349. Of course, depending on the particular implementation, tab 700 may be omitted from tube 326.

Figure 11:
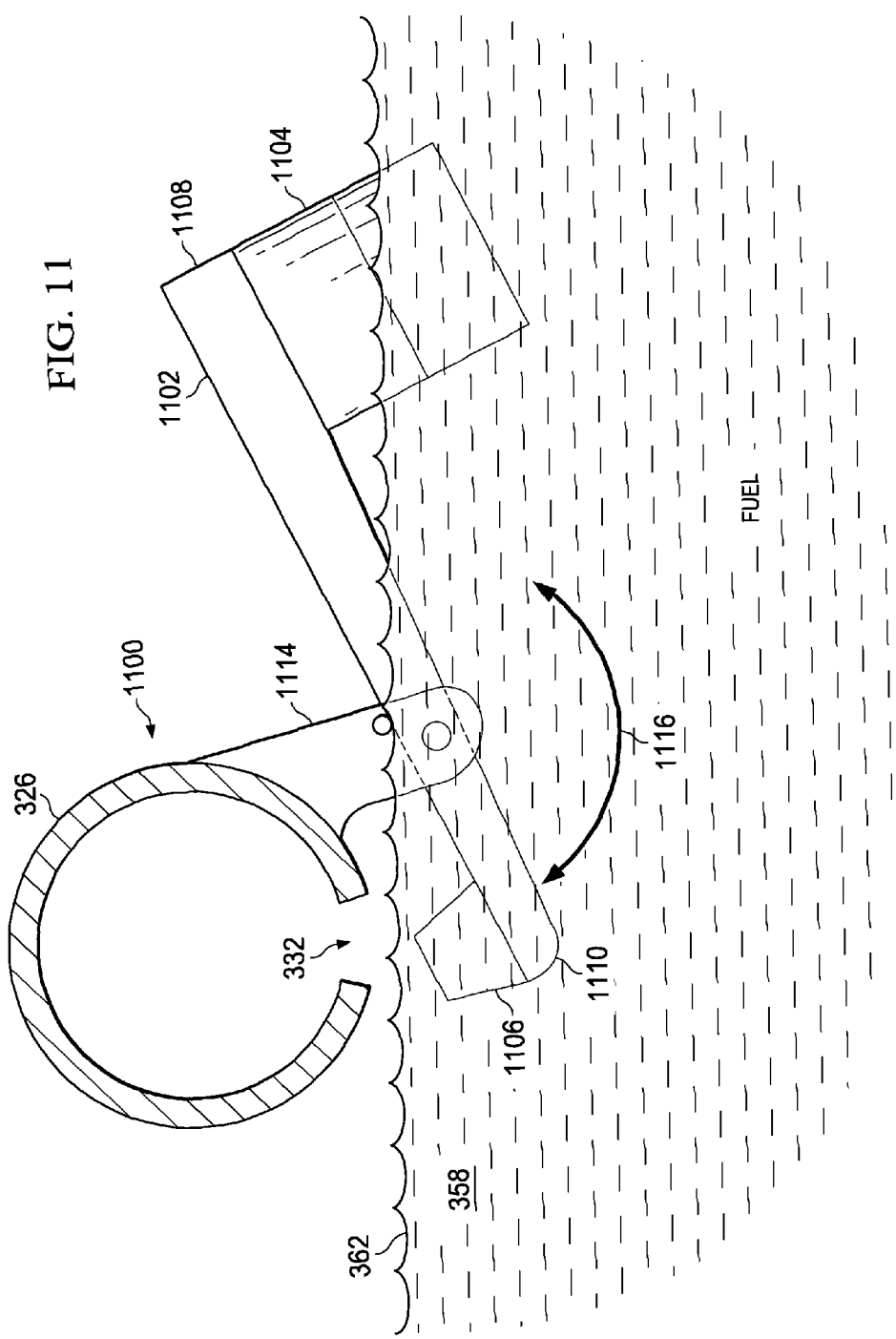
FIG. 11 is an illustration of a valve for an inert gas distribution system in accordance with an advantageous embodiment.

For example, in FIG. 11 an illustration of a valve in an open position is depicted in accordance with an advantageous embodiment. In this illustrative example, valve 1100 is an example of a valve that may be used in place of valve 349 with tube 326 in FIG. 3.

In this illustrative example, valve 1100 comprises rotatable member 1102, float structure 1104, and protrusion 1106. Float structure 1104 is associated with end 1108 of rotatable member 1102. Protrusion 1106 is associated with end 1110 of rotatable member 1102. Valve 1100 also includes connector 1114. Connector 1114 connects rotatable member 1102 to tube 326. Rotatable member 1102 may rotate in the direction of arrow 1116. Protrusion 1106 may allow gas to flow from opening 332 when in an open position as illustrated in this figure.

Float structure 1104 floats in fuel 358 to maintain an open position for opening 332 when fuel surface 362 of fuel 358 has a level not lower than some selected distance from opening 332 in this illustrative example.

Figure 12:
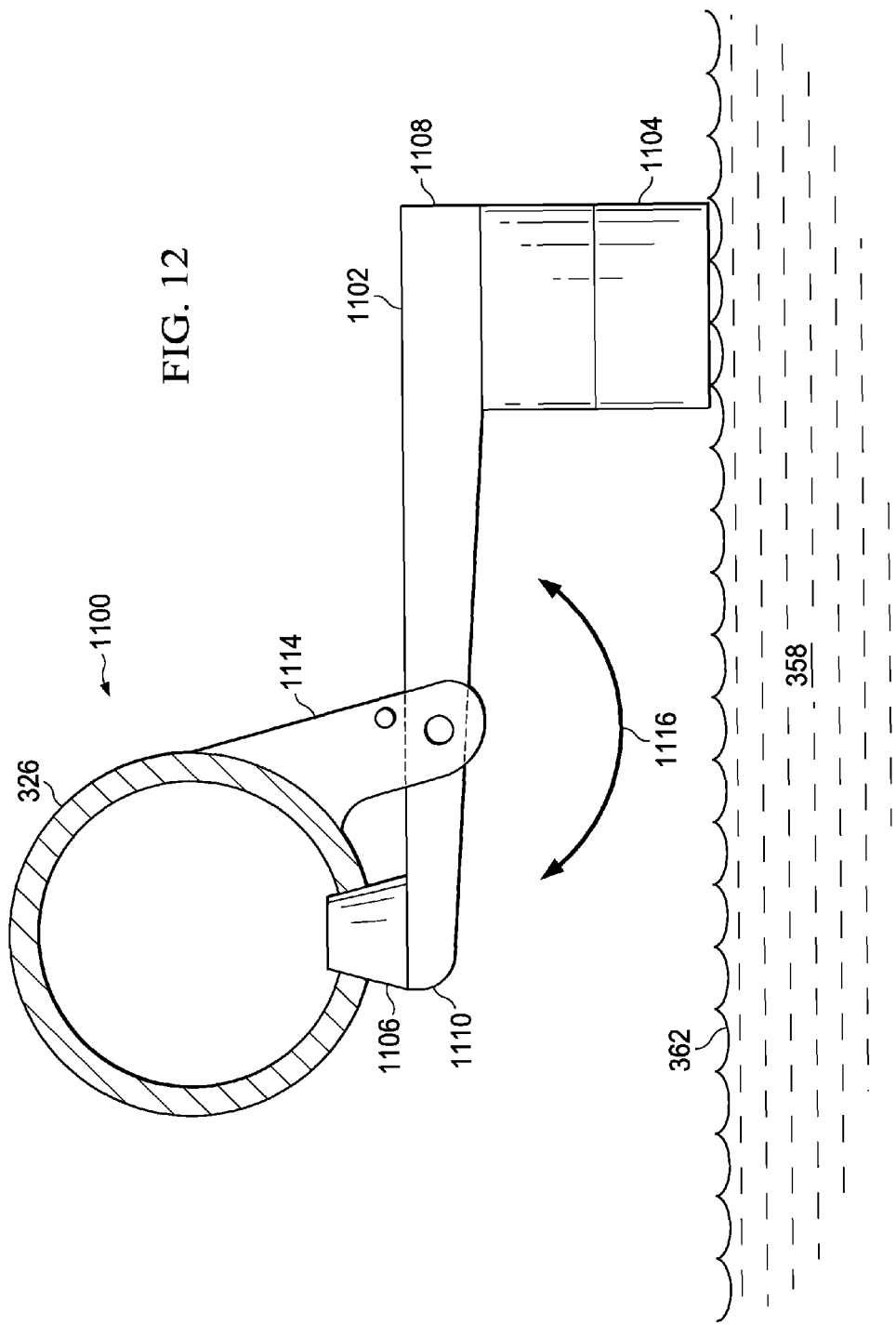
FIG. 12 is an illustration of a valve connected to a tube in an inert gas distribution system in accordance with an advantageous embodiment.

Turning next to FIG. 12, an illustration of a valve in a closed position is depicted in accordance with an advantageous embodiment. As depicted, fuel surface 362 of fuel 358 has a lower level as compared to FIG. 11. In this illustrative example, the lowering of fuel surface 362 causes valve 1100 to move into a closed position. In this closed position, protrusion 1106 covers opening 332 in a manner that prevents or reduces an inert gas from flowing out of opening 332.

The illustration of valve 1100 is an example of another implementation for valve 156 shown in block form in FIG. 1. Of course, other valves may be used, depending on the particular implementation. In still other illustrative examples, a valve may be implemented using a detector that detects the level of fuel in an actuator that opens and closes a valve based on the level of the fuel detected.

Figure 13:
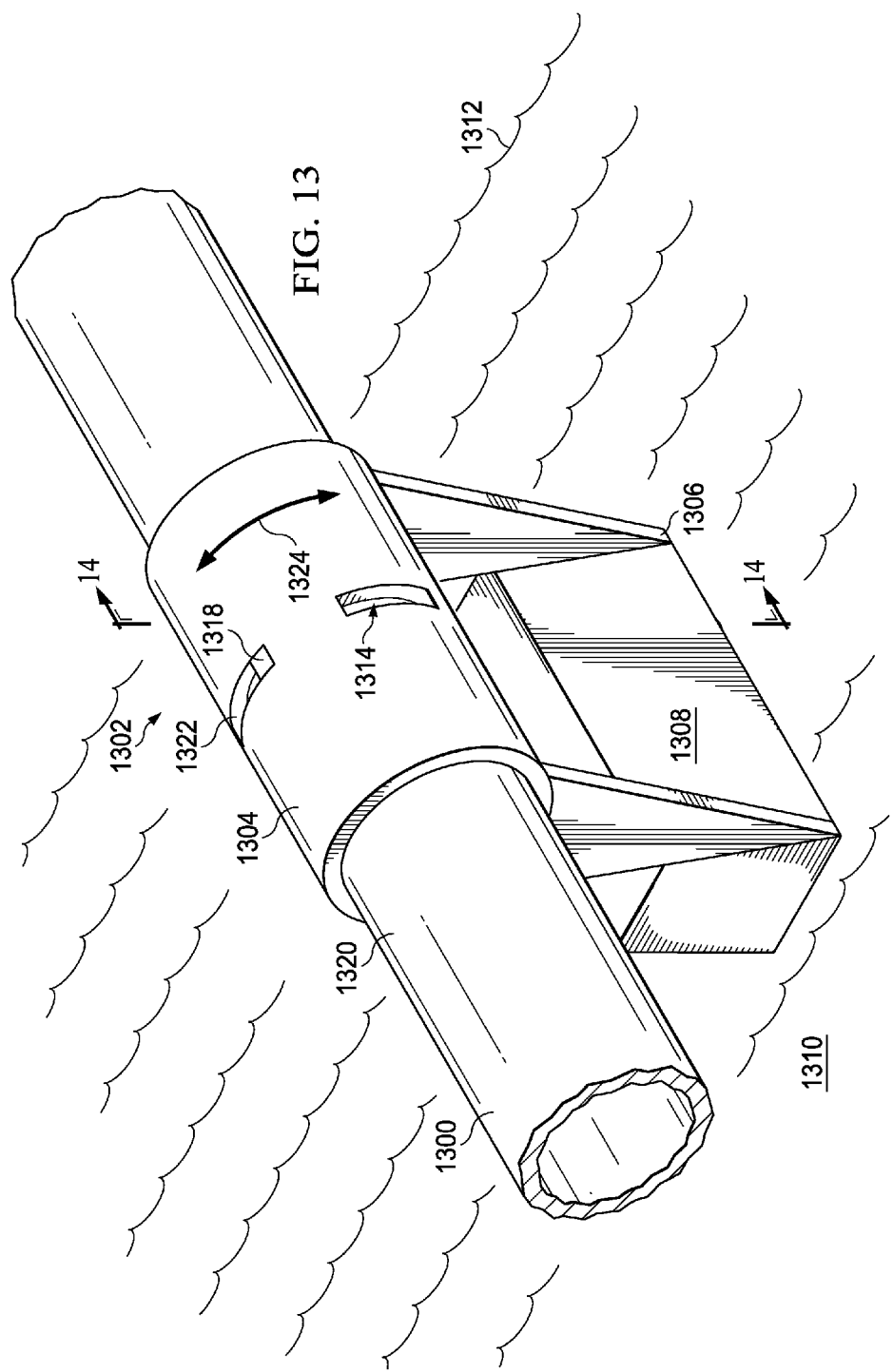
FIG. 13 is an illustration of a valve associated with a tube in accordance with an advantageous embodiment.

With reference now to FIG. 13, an illustration of a valve associated with a tube is depicted in accordance with an advantageous embodiment. In this figure, a perspective view of tube 1300 with valve 1302 is seen.

As depicted, tube 1300 is an example of tube 144 shown in block form in FIG. 1. Valve 1302 is an example of an implementation for valve 156 shown in block form in FIG. 1. Valve 1302 and tube 1300 may be used in fuel tank 308 in wing 202 as part of gas distribution system 327 in FIG. 3.

In this illustrative example, valve 1302 comprises cylindrical portion 1304, planar member 1306, and float structure 1308. Valve 1302 is in a closed position when level 1312 of fuel 1310 is below float structure 1308. As depicted, opening 1314 is configured to substantially prevent the flow of gas when valve 1302 is in the closed position.

In this illustration, tab 1318 extends from surface 1320 through opening 1322 in cylindrical portion 1304 of tube 1300. Tab 1318 may limit the movement of valve 1302 in the direction of arrow 1324. More specifically, the movement of opening 1322 may be limited by tab 1318.

Figure 14:
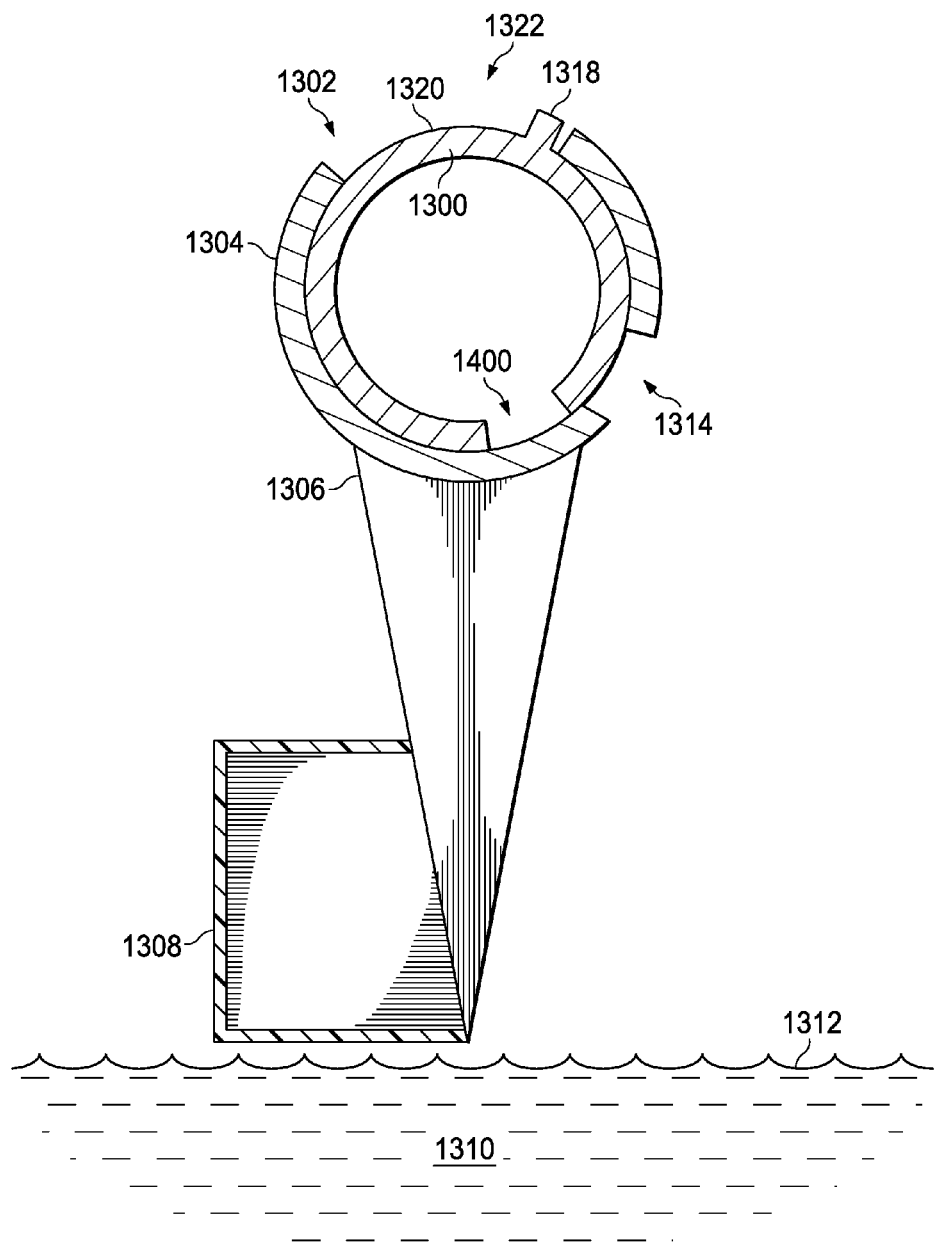
FIG. 14 is an illustration of a cross-sectional view of a valve connected to a tube for an inert gas distribution system taken along lines 14-14 in FIG. 13 in which the valve is shown in a closed position in accordance with an advantageous embodiment.

With reference now to FIG. 14, an illustration of a cross-sectional view of a valve connected to a tube for an inert gas distribution system taken along lines 14-14 in FIG. 13 is depicted in accordance with an advantageous embodiment. In this illustrative example, a cross-sectional view of tube 1300 with valve 1302 is depicted. In this view, level 1312 of fuel 1310 is below float structure 1308.

As can be seen in this illustrative example, valve 1302 is in a closed position such that opening 1314 in cylindrical portion 1304 is not in communication with opening 1400 of tube 1300. Thus, gas is unable to flow through opening 1400 when valve 1302 is in this position.

As depicted, cylindrical portion 1304 is configured to be able to move such that opening 1314 lines up or corresponds to opening 1400 in tube 1300 on which valve 1302 is associated. As portions of opening 1314 and opening 1400 line up with each other, an inert gas may flow through opening 1400 and opening 1314. Thus, opening 1314 may allow for all or a portion of opening 1400 in tube 1300 to be exposed to allow for inert gas to flow from opening 1400 in tube 1300.

Figure 15:
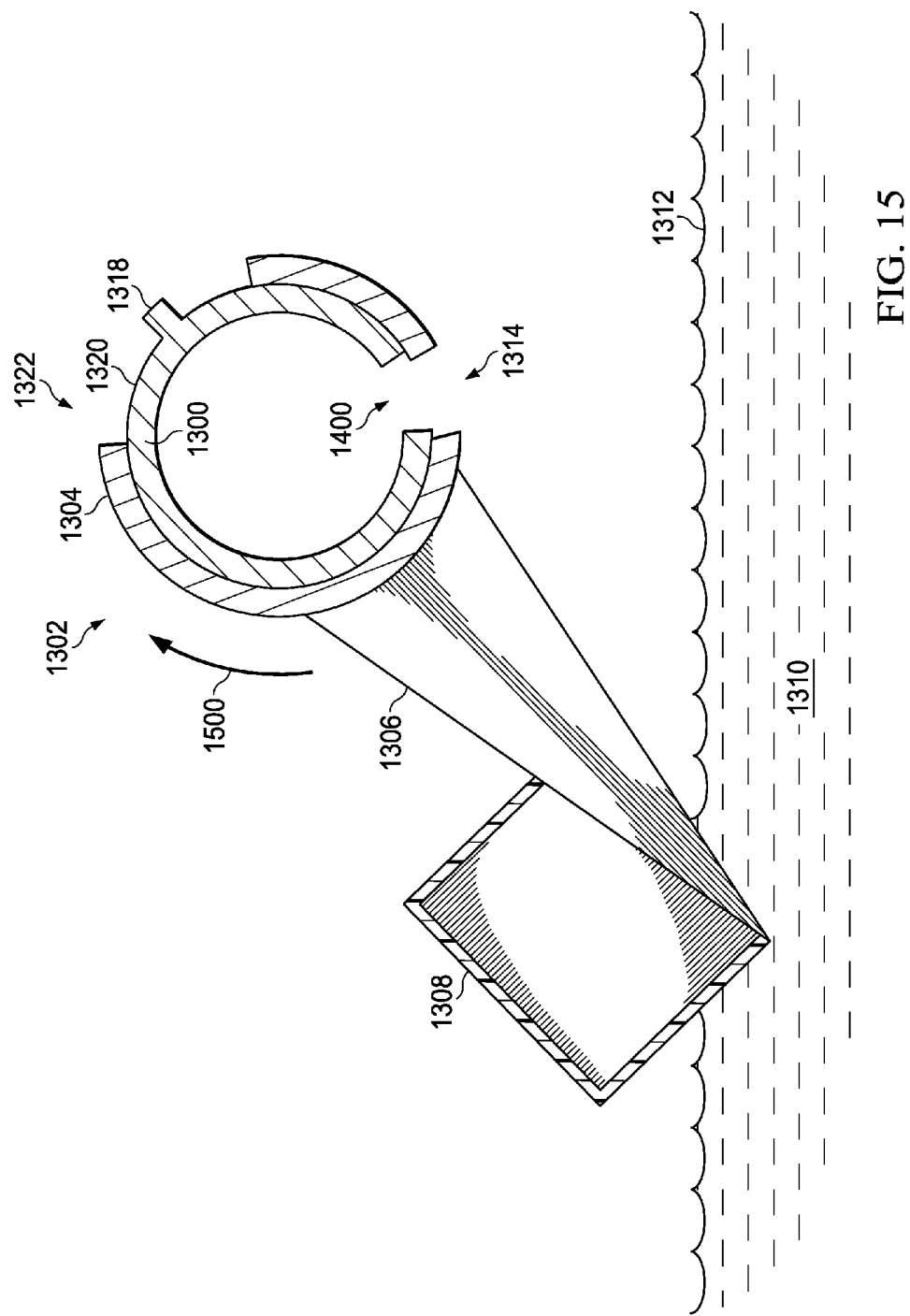
FIG. 15 is an illustration of a valve in a partially-open position in accordance with an advantageous embodiment.

Turning next to FIG. 15, an illustration of a valve in a partially-open position is depicted in accordance with an advantageous embodiment. In this illustrative example, level 1312 of fuel 1310 is higher relative to tube 1300.

As can be seen in this illustrative example, float structure 1308 is partially immersed in fuel 1310. As level 1312 of fuel 1310 rises, float structure 1308 is buoyant within fuel 1310. Float structure 1308 is configured to move such that valve 1302 rotates in the direction of arrow 1500.

This rotation causes opening 1314 to line up with a portion of opening 1400. As can be seen in this illustrative example, opening 1400 is partially exposed to allow inert gas to flow from opening 1400. In this example, opening 1400 is in a partially-open state.

Figure 16:
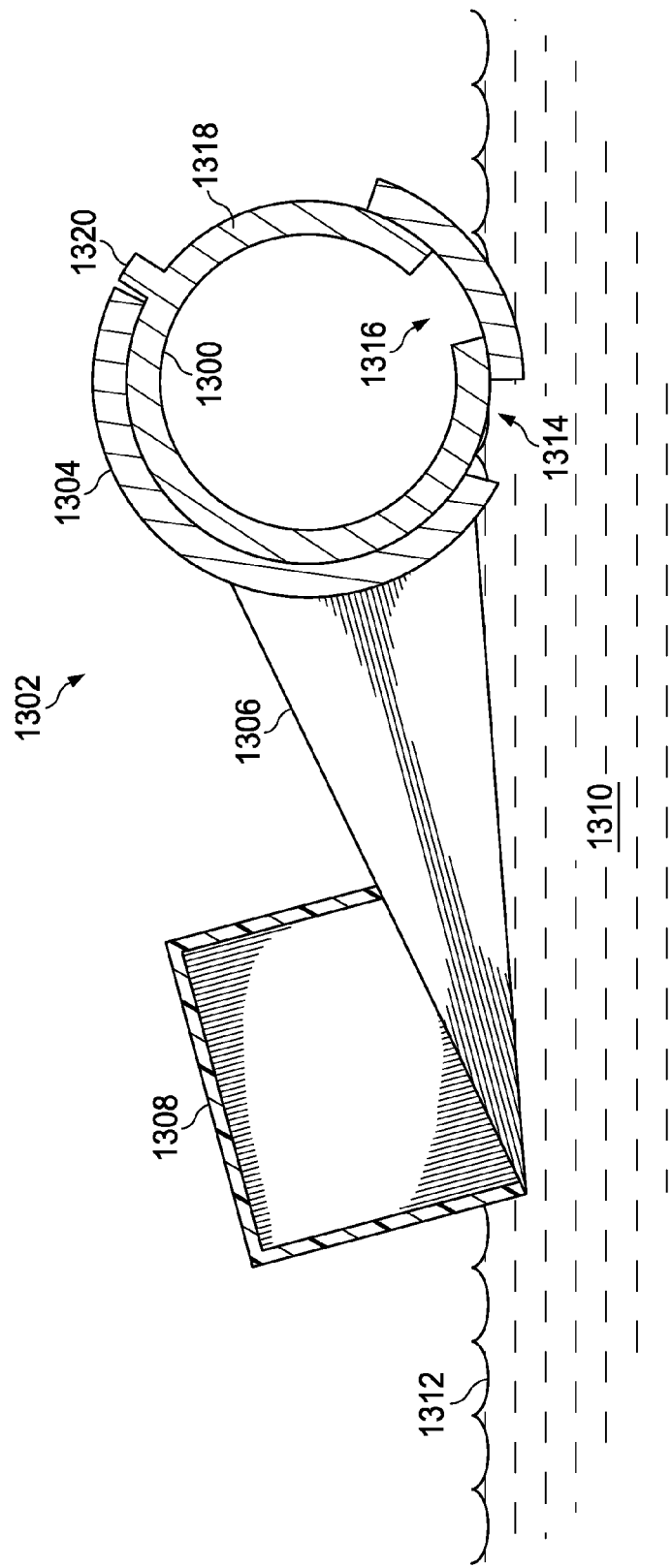
FIG. 16 is an illustration of a valve in a closed position in accordance with an advantageous embodiment.

With reference now to FIG. 16, an illustration of a valve in a closed position is depicted in accordance with an advantageous embodiment. In this illustrative example, level 1312 of fuel 1310 is above opening 1400 in tube 1300. With this level for fuel 1310, valve 1302 is in a closed position. As can be seen in this illustrative example, tab 1318 limits the amount of rotation of valve 1302. Of course, depending on the particular implementation, tab 1318 may be omitted from tube 1300.

As depicted in this illustration, valve 1302 is closed when level 1312 of fuel 1310 is above tube 1300. This may prevent undesired backflow of fuel 1310 into tube 1300 when wing 202 in FIG. 2 has a shape that may have a tendency for backflow into tube 1300.

The illustration of an inert gas distribution system in FIGS. 3-16 is an example of one implementation of inert gas system 136 shown in block form in FIG. 1. The illustrations of the different components for the inert gas system are not meant to imply physical or architectural limitations to the manner in which different advantageous embodiments may be implemented. The different components illustrated in FIGS. 3-16 may be combined with components in FIG. 1, used with components in FIG. 1, or a combination of the two. Additionally, some of the components illustrated in these figures may be illustrative examples of how components shown in block form in FIG. 1 may be implemented as physical structures.

For example, in other illustrative examples, tab 700 may be omitted from tube 326. As yet another illustrative example, other types of valves may be used in addition to and/or in place of valve 349.

With reference now to FIG. 17, an illustration of a flowchart of a process for managing inert gas in a fuel tank is depicted in accordance with an advantageous embodiment. The process illustrated in FIG. 17 may be implemented in platform 102 in FIG. 1. In particular, the operations illustrated in FIG. 17 may be implemented using inert gas system 136 in FIG. 1.

The process begins by sending an inert gas into a tube extending into the fuel tank of the aircraft (operation 1700). The tube has openings through the inert gas flowing into the fuel tank.

The process controls the amount of inert gas flowing from the openings using a valve system based on a level of fuel relative to the openings (operation 1702), with the process returning to operation 1700. This process may continue as long as inert gas is sent into the tube.

In these illustrative examples, the controlling of the inert gas flowing from the openings using the valve system means that some of the openings may be opened or partially opened, while other openings may be closed. In this manner, the amount of inert gas flowing from the openings occurs such that inert gas is sent into areas in which a space is present above the level of the fuel. This space is a space in which air and vapors may be located. In this manner, inert gas may be more efficiently used to reduce a possibility of combustion of fuel in a fuel tank in spaces in which the fuel is not present.

The different advantageous embodiments may allow for a lighter or smaller inert gas generator to be used to provide for a desired flow of the inert gas. As a result, the inert gas may be distributed only at locations with a specific vertical distance of the fuel surface from the tube. This type of control of the distribution of the inert gas may be especially useful for fuel tanks in aircraft that have a positive or negative dihedral. Of course, this distribution system may be used in other types of platforms, as discussed above, in addition to aircraft.

Advantageous embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in accordance with an advantageous embodiment. During preproduction, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an advantageous embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 1800 in FIG. 18. In one illustrative example, components or subassemblies produced in component and subassembly manufacturing 1806 in FIG. 18 may be fabricated or manufactured in a manner similar to components or subassemblies produced while aircraft 1900 is in service 1812 in FIG. 18.

As yet another example, one or more apparatus embodiments, method embodiments, or a combination thereof may be utilized during production stages, such as component and subassembly manufacturing 1806 and system integration 1808 in FIG. 18. One or more apparatus embodiments, method embodiments, or a combination thereof may be utilized while aircraft 1900 is in service 1812 and/or during maintenance and service 1814 in FIG. 18.

For example, inert gas system 136 may be added to aircraft 1900 during component and subassembly manufacturing 1806, during maintenance and service 1814, or other suitable stages. In these illustrative examples, if an inert gas system is currently present in the aircraft, the inert gas system may be replaced or upgraded during maintenance and service 1814. For example, a currently-present inert gas system may have valve system 148 added to the tubes in the inert gas system in accordance with an advantageous embodiment.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a tube configured to carry an inert gas in a fuel tank;
    an opening in the tube; and
    a valve associated with the opening, the valve comprising:
        a substantially cylindrical portion connected to the tube and configured to rotate around the tube to open and close the opening based on a position of the cylindrical portion; and
        a float structure connected to the cylindrical portion, the float structure buoyant in the fuel, movement of the float structure rotating the cylindrical portion, and the valve configured to control an amount of the inert gas that exits the opening based on a level of fuel relative to the opening, such that when a fuel level is below a first level the valve is closed, when the fuel level is at a second level, relatively higher than the first level, the valve is partially open, and when the fuel level is at a third level, relatively higher than the second level, the valve is fully open.

2. The apparatus of claim 1, wherein the fuel tank is located in a wing of an aircraft.

3. The apparatus of claim 2, wherein the wing has one of a positive dihedral and a negative dihedral.

4. The apparatus of claim 3, wherein the tube comprises a number of openings in addition to the opening to form a plurality of openings; a number of valves associated with the number of openings in the plurality of openings, and the fuel tank comprises a number of compartments, each of the plurality of openings and the plurality of valves disposed in an individual compartment in the number of compartments, and the wing characterized by a dihedral and fuel level such that a first portion of the number of valves in the number of compartments are open and a second portion of the number of valves in the number of compartments are closed.

5. The apparatus of claim 4, wherein the tube is located between a root of a wing and a tip of the wing.

6. The apparatus of claim 1, wherein the tube comprises a tab extending through an opening in the cylindrical portion and a rotational movement of the cylindrical portion between an open position and a closed position is restricted by the tab.

7. The apparatus of claim 1, wherein the float structure causes the cylindrical portion to rotate to close the opening when the level of fuel is lower than the opening by a selected amount.

8. The apparatus of claim 1 further comprising:
    an inert gas generator, wherein the inert gas generator is configured to send the inert gas into the tube at a desired flow rate.

9. The apparatus of claim 1, wherein the inert gas is selected from one of nitrogen, neon, argon, helium, krypton, xenon, radon, sulfur hexafluoride, carbon dioxide, and air with reduced oxygen content.

10. The apparatus of claim 1, wherein the fuel tank is located in a platform selected from one of a mobile platform, a stationary platform, a land-based structure, an aquatic-based structure, a space-based structure, a vehicle, an aircraft, a surface ship, a tank, a personnel carrier, a train, a spacecraft, a space station, a satellite, a submarine, an automobile, a power plant, a bridge, a dam, a manufacturing facility, and a building.

11. A fuel tank system comprising:
    a fuel tank having a number of compartments, the number of compartments positioned in a wing of an aircraft having a positive dihedral;
    an inert gas system having a tube positioned in the number of compartments, the tube having a number of openings disposed in the number of compartments and configured for an inert gas in the fuel tank system to pass into the number of compartments of the fuel tank; and
    a valve system having a number of valves disposed in the number of compartments, a valve in the number of valves comprising:
        a cylindrical portion configured to be connected to the tube and configured to rotate around the tube to open and close the openings based on a position of the cylindrical portion; and
        a float structure connected to the cylindrical portion, wherein the float structure is configured to be buoyant in the fuel and to rotate the cylindrical portion depending on a fuel level in the number of compartments, the valve system configured to control an amount of the inert gas that flows from the openings into the fuel tank based on a level of fuel in the fuel tank;

wherein the number of valves are configured to manage the delivery of inert gas to the number of compartments based on a level of fuel in each compartment, such that when a fuel level in a first compartment is below a first level the valve is closed, when the fuel level in a second compartment is at a relatively higher level than the first compartment the valve is partially open, and when the fuel level in a third compartment is at a relatively higher level than the second compartment the valve is fully open.

12. The fuel tank system of claim 11, wherein the inert gas system includes a tube having a plurality of openings and wherein the valve system comprises a plurality of valves associated with the plurality of openings, a fuel level in a first number of compartments is different than the fuel level in a second number of compartments, and a first number of valves in the first number of compartments are open and a second number of valves in a second number of compartments are closed.

13. The fuel tank system of claim 11, wherein the tube comprises a number of tabs extending through the number of openings in the tube and a rotational movement of the cylindrical portion between an open position and a closed position is restricted by the tab.

14. A method of managing an inert gas in a fuel tank, the method comprising:

sending the inert gas into a tube extending into the fuel tank, wherein the fuel tank has a number of compartments, the tube has a number of openings in the number of compartments, and a number of valves are disposed in the number of compartments, the fuel level in the number of compartments being at a different level;

raising and lowering a number of floats connected to the number of valves with respect to a fuel level so as to rotate a number of cylindrical members in the number of valves; and controlling an amount of the inert gas flowing from the openings using a valve system based on a level of fuel relative to the openings, such that when a fuel level in a first compartment is below a first level the valve is closed, when the fuel level in a second compartment is at a relatively higher level than the first compartment the valve is partially open, and when the fuel level in a third compartment is at a relatively higher level than the second compartment, the valve is fully open.

15. The method of claim 14, wherein controlling the amount of the inert gas flowing from the openings using the valve system based on the level of fuel relative to the openings comprises:

closing an opening in the openings with a valve in the valve system when a selected level for the level of fuel is reached; and setting the number of valves to be fully open when a fuel level in each compartment is at a desired level below the valve.

16. The method of claim 15, wherein closing the opening in the openings with the valve in the valve system when the selected level for the level of fuel is reached comprises:

closing the opening in the openings with the valve in the valve system when the selected level for the level of fuel is one of a first level below the opening, a second level at the opening, and a third level above the opening.

* * * * *